United States Patent
Tsuji et al.

(10) Patent No.: US 11,524,705 B2
(45) Date of Patent: Dec. 13, 2022

(54) VEHICLE CONTROL SYSTEM

(71) Applicant: HONDA MOTOR CO., LTD., Tokyo (JP)

(72) Inventors: Kanta Tsuji, Wako (JP); Daichi Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 74 days.

(21) Appl. No.: 16/832,783

(22) Filed: Mar. 27, 2020

(65) Prior Publication Data

US 2020/0307640 A1   Oct. 1, 2020

(30) Foreign Application Priority Data

Mar. 29, 2019   (JP) ............................. JP2019-067609

(51) Int. Cl.
*B60W 10/20*   (2006.01)
*B60W 60/00*   (2020.01)
*B60W 30/06*   (2006.01)
*G05D 1/02*   (2020.01)

(52) U.S. Cl.
CPC ........ *B60W 60/0051* (2020.02); *B60W 10/20* (2013.01); *B60W 30/06* (2013.01); *B60W 60/0016* (2020.02); *G05D 1/0212* (2013.01); *G05D 1/0231* (2013.01); *G05D 1/0268* (2013.01); *B60W 2540/229* (2020.02); *G05D 2201/0213* (2013.01)

(58) Field of Classification Search
CPC ..................... B60W 60/0051; B60W 60/0016
See application file for complete search history.

(56) References Cited

U.S. PATENT DOCUMENTS

| | | | |
|---|---|---|---|
| 9,722,902 B2 | 8/2017 | Oooka et al. | |
| 2009/0121899 A1* | 5/2009 | Kakinami | B62D 15/027 340/932.2 |
| 2015/0345961 A1* | 12/2015 | Oooka | G01C 21/3461 701/25 |
| 2017/0227970 A1* | 8/2017 | Taguchi | G05D 1/0257 |
| 2018/0292822 A1* | 10/2018 | Ichikawa | G06V 20/58 |

FOREIGN PATENT DOCUMENTS

JP   6064946 B2   1/2017

* cited by examiner

*Primary Examiner* — Vivek D Koppikar
*Assistant Examiner* — Jeffrey R Chalhoub
(74) *Attorney, Agent, or Firm* — Armstrong Teasdale LLP

(57) ABSTRACT

In a vehicle control system (1, 101), a control unit (15) is configured to execute a stop process by which the vehicle is parked in a prescribed stop position located within a permitted distance when it is detected that the control unit or the driver has become incapable of properly maintaining a traveling state of the vehicle, and, in executing the stop process, the control unit computes an agreement between an object (X) contained in the map information based on an estimated position of the vehicle and an object (Y) on the road detected by an external environment recognition device (6), the permitted distance being smaller when the agreement is below a prescribed agreement threshold than when the agreement is equal to or above the agreement threshold.

7 Claims, 5 Drawing Sheets

VEHICLE CONTROL SYSTEM

TECHNICAL FIELD

The present invention relates to a vehicle control system configured for autonomous driving.

BACKGROUND ART

In a known drive assistance system, when a driver has become unable to perform a driving operation, the vehicle is autonomously driven to a safe position. See JP6064946B2, for instance. According to this prior art, the latitude/longitude information of the vehicle is obtained by a GPS sensor that receives signals from geodetic satellites, and the vehicle is driven to the safe position according to the obtained latitude/longitude information and map information.

Since the conventional drive assistance system relies on the signals obtained by the GPS sensor, it is necessary to be able to receive the signals from the satellites for the drive assistance system to autonomously drive the vehicle to the safe position. However, when the signals from the satellites are obstructed by buildings or other objects, the drive assistance system may not be able to function properly.

SUMMARY OF THE INVENTION

In view of such a problem of the prior art, a primary object of the present invention is to provide a vehicle control system configured for autonomous driving that can autonomously drive the vehicle to a safe position in a reliable manner when the driver has become unable to drive the vehicle properly even when a handover request is made.

To achieve such an object, the present invention provides a vehicle control system, comprising (1):

a control unit (15) for steering, accelerating and decelerating a vehicle;

an occupant monitoring device (11) configured to monitor a driver of the vehicle; and a map device (9) storing map information, and configured to estimate a position of the vehicle; and an external environment recognition device (6) for recognizing a surrounding environment of the vehicle;

wherein the control unit is configured to execute a stop process by which the vehicle is parked in a prescribed stop position located within a permitted distance when it is detected that the control unit or the driver has become incapable of properly maintaining a traveling state of the vehicle, and wherein, in executing the stop process, the control unit computes an agreement between an object (X) contained in the map information based on an estimated position of the vehicle and an object (Y) on the road detected by the external environment recognition device, the permitted distance being smaller when the agreement is below a prescribed agreement threshold than when the agreement is equal to or above the agreement threshold.

As the positional accuracy of the vehicle estimated by the map device decreases, the degree of agreement between an object on the road included in the map information and the object on the road detected by the external environment recognition device becomes lower. According to this arrangement, when the degree of agreement is below the agreement threshold, the permitted distance, which is the distance which the vehicle is permitted to travel before reaching a stop area, is shorter than in other cases. As a result, the distance traveled before the vehicle comes to a stop (a stopping distance) becomes shorter as the position of the vehicle acquired by the map device gets less accurate. Therefore, the vehicle can be evacuated more safely.

Preferably, the control unit sets the permitted distance to a first permitted distance when the agreement is equal to or above the agreement threshold when the stop process is initiated, and the agreement has persisted to be equal to or above the agreement threshold between a time point when the stop process is initiated and a time point when the vehicle was at a position preceding a position of the vehicle when the stop process is initiated by a prescribed distance, sets the permitted distance to a second permitted distance when the agreement is equal to or above the agreement threshold when the stop process is initiated, and the agreement was below the agreement threshold a least in a part of the time interval between the time point when the stop process is initiated and the time point when the vehicle was at the position preceding the position of the vehicle when the stop process is initiated by the prescribed distance, and sets the permitted distance to a third permitted distance when the agreement below the agreement threshold when the stop process is initiated, the first permitted distance being longer than the second permitted distance, the second permitted distance being longer than the third permitted distance.

The accuracy of the position of the vehicle can be evaluated according to the history of the degree of agreement, and if it is likely to be inaccurate, the stopping distance can be shortened so that the vehicle can be evacuated more safely.

Preferably, in executing the stop process, the control unit controls the vehicle according to the position of the vehicle estimated by the map device and a detection result of the external environment recognition device when the agreement is equal to or above a prescribed stop threshold, and according to the detection result of the external environment recognition device and not according to the position of the vehicle estimated by the map device when the agreement is below prescribed stop threshold.

Thereby, during the stop process, when the degree of agreement is below the stop threshold, the vehicle is controlled according to the information obtained by the external environment recognition device so that the vehicle is prevented from being controlled according the position of the vehicle estimated by the map device when the position of the vehicle estimated by the map device is considered to be inaccurate.

Preferably, in executing the stop process, the control unit determines the agreement to be below the stop threshold when the position of the vehicle cannot be estimated by the map device, and controls the vehicle according to the detection result of the external environment recognition device.

Thereby, during the stop process, when the position of the vehicle cannot be estimated by the map device, the vehicle is controlled according to the information provided by the external environment recognition device. As a result, the vehicle is controlled according to the detection result of the external environment recognition device. Therefore, when the position of the vehicle estimated by the map device is inaccurate, the vehicle can be prevented from being controlled according to the position of the vehicle estimated by the map device so that the vehicle can be evacuated more safely.

Preferably, in executing a process other than the stop process, the control unit controls the vehicle according to the position of the vehicle estimated by the map device and the detection result of the external environment recognition device when the agreement is equal to or above a prescribed travel threshold, and according to the detection result of the external environment recognition device and not according to the position of the vehicle estimated by the map device when the agreement is below the travel threshold.

Thus, the position of the vehicle estimated by the map device is referred to when the degree of agreement is equal to or above the stop threshold in the stop process and when the degree of agreement is equal to or above the travel threshold at times other than the stop process. Thus, a higher degree of agreement is required in the stop process than in the processes other than the stop process for referring to the map device so that the vehicle can be evacuated more safely.

Preferably, the map information includes road marking information, and in executing the stop process, the control unit compares an image of a road marking acquired by the external environment recognition device with information of the road marking extracted from the map information according to the estimated position of the vehicle to determine the agreement.

Thereby, the degree of agreement can be easily obtained.

The present invention further provides a vehicle control system (101), comprising:

a control unit (15) for steering, accelerating and decelerating a vehicle (S);

an occupant monitoring device (11) configured to monitor a driver of the vehicle; and a map device (9) storing map information, and configured to estimate a position of the vehicle; and an external environment recognition device (6) for recognizing a surrounding environment of the vehicle;

wherein the control unit is configured to execute a stop process by which the vehicle is brought to a stop within a permitted time when it is detected that the control unit or the driver has become incapable of properly maintaining a traveling state of the vehicle, and wherein, in executing the stop process, the control unit computes an agreement between an object contained in the map information based on an estimated position of the vehicle and an object on the road detected by the external environment recognition device, the permitted time being shorter when the agreement is below a prescribed agreement threshold than when the agreement is equal to or above the agreement threshold.

As the positional accuracy of the vehicle estimated by the map device decreases, the degree of agreement between an object on the road included in the map information and the object on the road detected by the external environment recognition device becomes lower. According to this arrangement, when the degree of agreement is below the agreement threshold, the permitted time, which is the time during which the vehicle is permitted to travel before reaching a stop area, is shorter than in other cases. As a result, the time spent before the vehicle comes to a stop (a stopping distance) becomes shorter as the position of the vehicle acquired by the map device gets less accurate. Therefore, the vehicle can be evacuated more safely.

Preferably, the control unit sets the permitted time to a first permitted time when the agreement is equal to or above the agreement threshold when the stop process is initiated, and the agreement has persisted to be equal to or above the agreement threshold between a time point when the stop process is initiated and a time point when the vehicle was at a position preceding a position of the vehicle when the stop process is initiated by a prescribed time, sets the permitted time to a second permitted time when the agreement is equal to or above the agreement threshold when the stop process is initiated, and the agreement was below the agreement threshold at least in a part of the time interval between the time point when the stop process is initiated and the time point when the vehicle was at the position preceding the position of the vehicle when the stop process is initiated by the prescribed time, and sets the permitted time to a third permitted time when the agreement below the agreement threshold when the stop process is initiated, the first permitted time being longer than the second permitted time, the second permitted time being longer than the third permitted time.

The accuracy of the position of the vehicle can be evaluated according to the history of the degree of agreement, and if it is likely to be inaccurate, the time that is spent in traveling to the stop area can be shortened so that the vehicle can be evacuated more safely.

The present invention thus provides a vehicle control system configured for autonomous driving that can autonomously drive the vehicle to a safe position in a reliable manner when the driver has become unable to drive the vehicle properly even when a handover request is made.

BRIEF DESCRIPTION OF THE DRAWING(S)

DESCRIPTION OF THE PREFERRED EMBODIMENT(S)

The following acronyms are used throughout the Specification and are defined below.

GNSS: Global Navigation Satellite System

CCD: Charge Coupled Device

CMOS: Complementary Metal Oxide Semiconductor

SAE J3016: Japanese Translation of SEP 2016. SEP J3016 is a standard (SURFACE VEHICLE RECOMMENDED PRACTICE) published by SAE International LSI: Large Scale Integrated Circuit ASIC: Application Specific Integrated Circuit FPGA: Field Programmable Gate Array A vehicle control system according to a preferred embodiment of the present invention is described in the following with reference to the appended drawings. The following disclosure is according to left-hand traffic. In the case of right-hand traffic, the left and the right in the disclosure will be reversed.

Figure 1:
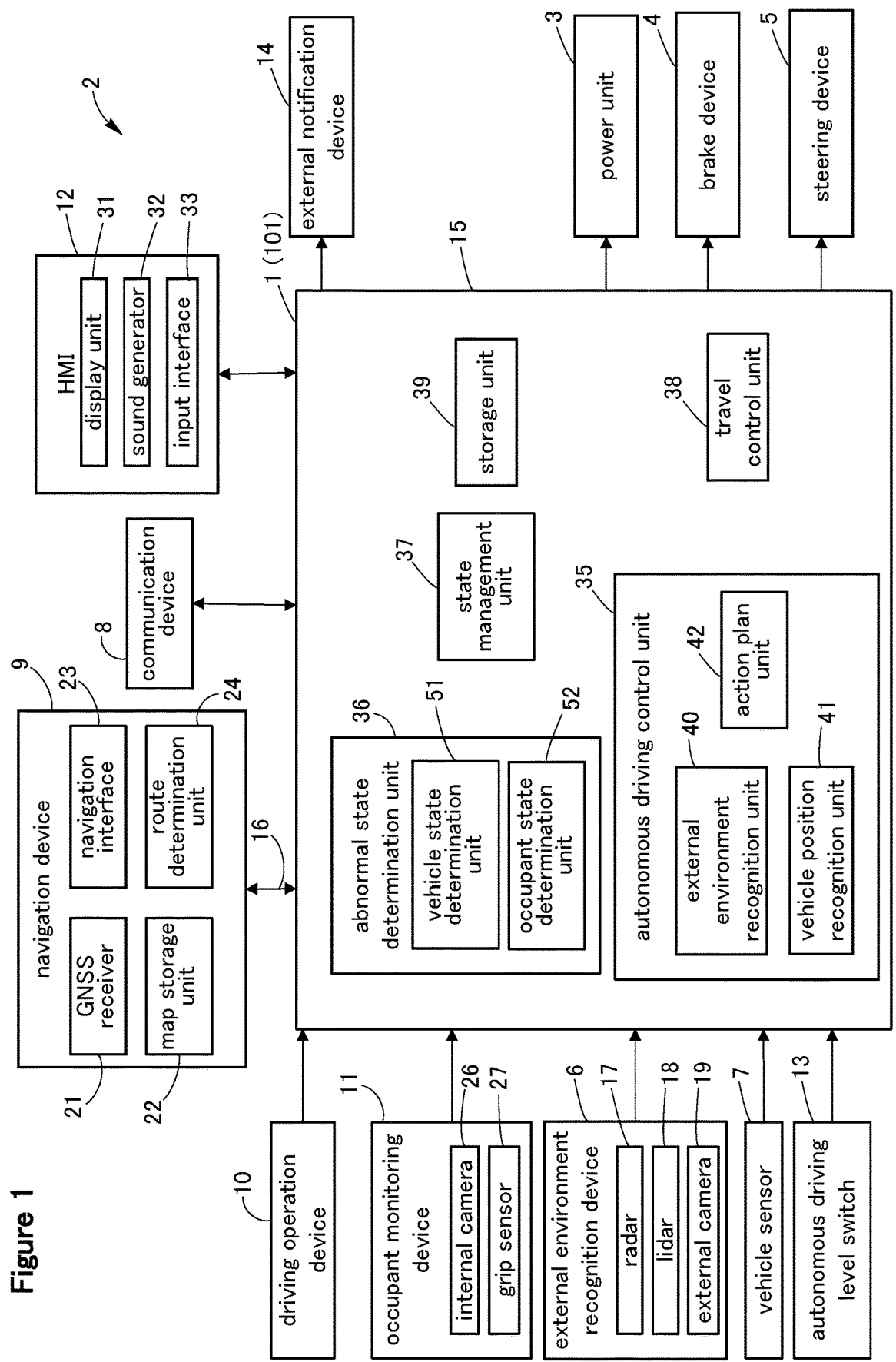
FIG. 1 is a functional block diagram of a vehicle on which a vehicle control system according to the present invention is mounted.

As shown in FIG. 1, the vehicle control system 1 according to the present invention is a part of a vehicle system 2 mounted on a vehicle. The vehicle system 2 includes a power unit 3, a brake device 4, a steering device 5, an external environment recognition device 6, a vehicle sensor 7, a communication device 8, a navigation device 9 (map device), a driving operation device 10, an occupant monitoring device 11, an HMI 12 (Human Machine Interface), an autonomous driving level switch 13, an external notification device 14, and a control unit 15. These components of the vehicle system 2 are connected to one another so that signals can be transmitted between them via a communication means such as CAN 16 (Controller Area Network).

The power unit 3 is a device for applying a driving force to the vehicle, and may include a power source and a transmission unit. The power source may consist of an internal combustion engine such as a gasoline engine and a diesel engine, an electric motor or a combination of these. The brake device 4 is a device that applies a braking force to the vehicle, and may include a brake caliper that presses a brake pad against a brake rotor, and an electrically actuated hydraulic cylinder that supplies hydraulic pressure to the brake caliper. The brake device 4 may also include a parking brake device. The steering device 5 is a device for changing a steering angle of the wheels, and may include a rack-and-pinion mechanism that steers the front wheels, and an electric motor that drives the rack-and-pinion mechanism. The power unit 3, the brake device 4, and the steering device 5 are controlled by the control unit 15.

The external environment recognition device 6 is a device that detects objects located outside of the vehicle. The external environment recognition device 6 may include a sensor that captures electromagnetic waves or light from around the vehicle to detect objects outside of the vehicle, and may consist of a radar 17, a lidar 18, an external camera 19, or a combination of these. The external environment recognition device 6 may also be configured to detect objects outside of the vehicle by receiving a signal from a source outside of the vehicle. The detection result of the external environment recognition device 6 is forwarded to the control unit 15.

The radar 17 emits radio waves such as millimeter waves to the surrounding area of the vehicle, and detects the position (distance and direction) of an object by capturing the reflected wave. Preferably, the radar 17 includes a front radar that radiates radio waves toward the front of the vehicle, a rear radar that radiates radio waves toward the rear of the vehicle, and a pair of side radars that radiates radio waves in the lateral directions.

The lidar 18 emits light such as an infrared ray to the surrounding part of the vehicle, and detects the position (distance and direction) of an object by capturing the reflected light. At least one lidar 18 is provided at a suitable position of the vehicle.

The external camera 19 can capture the image of the surrounding objects such as vehicles, pedestrians, guardrails, curbs, walls, median strips, road shapes, road signs, road markings painted on the road, and the like. The external camera 19 may consist of a digital camera using a solid-state imaging device such as a CCD and a CMOS. At least one external camera 19 is provided at a suitable position of the vehicle. The external camera 19 preferably includes a front camera that images the front of the vehicle, a rear camera that images the rear of the vehicle and a pair of side cameras that image the lateral views from the vehicle. The external camera 19 may consist of a stereo camera that can capture a three-dimensional image of the surrounding objects.

The vehicle sensor 7 may include a vehicle speed sensor that detects the traveling speed of the vehicle, an acceleration sensor that detects the acceleration of the vehicle, a yaw rate sensor that detects an angular velocity of the vehicle around a vertical axis, a direction sensor that detects the traveling direction of the vehicle, and the like. The yaw rate sensor may consist of a gyro sensor.

The communication device 8 allows communication between the control unit 15 which is connected to the navigation device 9 and other vehicles around the own vehicle as well as servers located outside the vehicle. The control unit 15 can perform wireless communication with the surrounding vehicles via the communication device 8. For instance, the control unit 15 can communicate with a server that provides traffic regulation information via the communication device 8, and with an emergency call center that accepts an emergency call from the vehicle also via the communication device 8. Further, the control unit 15 can communicate with a portable terminal carried by a person such as a pedestrian present outside the vehicle via the communication device 8.

The navigation device 9 is able to identify the current position of the vehicle, and performs route guidance to a destination and the like, and may include a GNSS receiver 21, a map storage unit 22, a navigation interface 23, and a route determination unit 24. The GNSS receiver 21 identifies the position (latitude and longitude) of the vehicle according to a signal received from artificial satellites (positioning satellites). The map storage unit 22 may consist of a per se known storage device such as a flash memory and a hard disk, and stores or retains map information. The navigation interface 23 receives an input of a destination or the like from the user, and provides various information to the user by visual display and/or speech. The navigation interface 23 may include a touch panel display, a speaker, and the like. In another embodiment, the GNSS receiver 21 is configured as a part of the communication device 8. The map storage unit 22 may be configured as a part of the control unit 15 or may be configured as a part of an external server that can communicate with the control unit 15 via the communication device 8.

The map information may include a wide range of road information which may include, not exclusively, road types such as expressways, toll roads, national roads, and prefectural roads, the number of lanes of the road, road markings such as the center position of each lane (three-dimensional coordinates including longitude, latitude, and height), road division lines and lane lines, the presence or absence of sidewalks, curbs, fences, etc., the locations of intersections, the locations of merging and branching points of lanes, the areas of emergency parking zones, the width of each lane, and traffic signs provided along the roads. The map information may also include traffic regulation information, address information (address/postal code), facility information, telephone number information, and the like.

The route determination unit 24 determines a route to the destination according to the position of the vehicle specified by the GNSS receiver 21, the destination input from the navigation interface 23, and the map information. When determining the route, in addition to the route, the route determination unit 24 determines the target lane which the vehicle will travel in by referring to the merging and branching points of the lanes in the map information.

The driving operation device 10 receives an input operation performed by the driver to control the vehicle. The driving operation device 10 may include a steering wheel, an accelerator pedal, and a brake pedal. Further, the driving operation device 10 may include a shift lever, a parking brake lever, and the like. Each element of the driving operation device 10 is provided with a sensor for detecting an operation amount of the corresponding operation. The driving operation device 10 outputs a signal indicating the operation amount to the control unit 15.

The occupant monitoring device 11 monitors the state of the occupant in the passenger compartment. The occupant monitoring device 11 includes, for example, an internal camera 26 that images an occupant sitting on a seat in the vehicle cabin, and a grip sensor 27 provided on the steering wheel. The internal camera 26 is a digital camera using a solid-state imaging device such as a CCD and a CMOS. The grip sensor 27 is a sensor that detects if the driver is gripping the steering wheel, and outputs the presence or absence of the grip as a detection signal. The grip sensor 27 may be formed of a capacitance sensor or a piezoelectric device provided on the steering wheel. The occupant monitoring device 11 may include a heart rate sensor provided on the steering wheel or the seat, or a seating sensor provided on the seat. In addition, the occupant monitoring device 11 may be a wearable device that is worn by the occupant, and can detect the vital information of the driver including at least one of the heart rate and the blood pressure of the driver. In this conjunction, the occupant monitoring device 11 may be configured to be able to communicate with the control unit 15 via a per se known wireless communication means. The occupant monitoring device 11 outputs the captured image and the detection signal to the control unit 15.

The external notification device 14 is a device for notifying to people outside of the vehicle by sound and/or light, and may include a warning light and a horn. A headlight (front light), a taillight, a brake lamp, a hazard lamp, and a vehicle interior light may function as a warning light.

The HMI 12 notifies the occupant of various kinds of information by visual display and speech, and receives an input operation by the occupant. The HMI 12 may include at least one of a display device 31 such as a touch panel and an indicator light including an LCD or an organic EL, a sound generator 32 such as a buzzer and a speaker, and an input interface 33 such as a GUI switch on the touch panel and a mechanical switch. The navigation interface 23 may be configured to function as the HMI 12.

The autonomous driving level switch 13 is a switch that activates autonomous driving as an instruction from the driver. The autonomous driving level switch 13 may be a mechanical switch or a GUI switch displayed on the touch panel, and is positioned in a suitable part of the cabin. The autonomous driving level switch 13 may be formed by the input interface 33 of the HMI 12 or may be formed by the navigation interface 23.

The control unit 15 may consist of an electronic control unit (ECU) including a CPU, a ROM, a RAM, and the like. The control unit 15 executes various types of vehicle control by executing arithmetic processes according to a computer program executed by the CPU. The control unit 15 may be configured as a single piece of hardware, or may be configured as a unit including a plurality of pieces of hardware. In addition, at least a part of each functional unit of the control unit 15 may be realized by hardware such as an LSI, an ASIC, and an FPGA, or may be realized by a combination of software and hardware.

The control unit 15 is configured to execute autonomous driving control of at least level 0 to level 3 by combining various types of vehicle control. The level is according to the definition of SAE J3016, and is determined in relation to the degree of machine intervention in the driving operation of the driver and in the monitoring of the surrounding environment of the vehicle.

In autonomous driving of level 0, the control unit 15 does not control the vehicle, and the driver performs all of the driving operations. Thus, autonomous driving of level 0 means a manual driving.

In autonomous driving of level 1, the control unit 15 executes a certain part of the driving operation, and the driver performs the remaining part of the driving operation. For example, autonomous driving level 1 includes constant speed traveling, inter-vehicle distance control (ACC; Adaptive Cruise Control) and lane keeping assist control (LKAS; Lane Keeping Assistance System). The level 1 autonomous driving is executed when various devices (for example, the external environment recognition device 6 and the vehicle sensor 7) required for executing the level 1 autonomous driving are all properly functioning.

In autonomous driving of level 2, the control unit 15 performs the entire driving operation. The level 2 autonomous driving is performed only when the driver monitors the surrounding environment of the vehicle, the vehicle is within a designated area, and the various devices required for performing the level 2 autonomous driving are all functioning properly.

In level 3 autonomous driving, the control unit 15 performs the entire driving operation. The level 3 autonomous driving requires the driver to monitor or be aware of the surrounding environment when required, and is executed only when the vehicle is within a designated area, and the various devices required for performing the level 3 autonomous driving are all functioning properly. The conditions under which the level 3 autonomous driving is executed may include that the vehicle is traveling on a congested road. Whether the vehicle is traveling on a congested road or not may be determined according to traffic regulation information provided from a server outside of the vehicle, or, alternatively, that the vehicle speed detected by the vehicle speed sensor is determined to be lower than a predetermined slowdown determination value (for example, 30 km/h) over a predetermined time period.

Thus, in the autonomous driving of levels 1 to 3, the control unit 15 executes at least one of the steering, the acceleration, the deceleration, and the monitoring of the surrounding environment. When in the autonomous driving mode, the control unit 15 executes the autonomous driving of level 1 to level 3. Hereinafter, the steering, acceleration, and deceleration operations are collectively referred to as driving operation, and the driving and the monitoring of the surrounding environment may be collectively referred to as driving.

In the present embodiment, when the control unit 15 has received an instruction to execute autonomous driving via the autonomous driving level switch 13, the control unit 15 selects the autonomous driving level that is suitable for the environment of the vehicle according to the detection result of the external environment recognition device 6 and the position of the vehicle acquired by the navigation device 9, and changes the autonomous driving level as required. However, the control unit 15 may also change the autonomous driving level according the input to the autonomous driving level switch 13.

As shown in FIG. 1, the control unit 15 includes an autonomous driving control unit 35, an abnormal state determination unit 36, a state management unit 37, a travel control unit 38, and a storage unit 39.

The autonomous driving control unit 35 includes an external environment recognition unit 40, a vehicle position recognition unit 41, and an action plan unit 42. The external environment recognition unit 40 recognizes an obstacle located around the vehicle, the shape of the road, the presence or absence of a sidewalk, and road signs according to the detection result of the external environment recognition device 6. The obstacles include, not exclusively, guardrails, telephone poles, surrounding vehicles, and pedestrians. The external environment recognition unit 40 can acquire the state of the surrounding vehicles, such as the position, speed, and acceleration of each surrounding vehicle from the detection result of the external environment recognition device 6. The position of each surrounding vehicle may be recognized as a representative point such as a center of gravity position or a corner positions of the surrounding vehicle, or an area represented by the contour of the surrounding vehicle.

The vehicle position recognition unit 41 recognizes a traveling lane, which is a lane in which the vehicle is traveling, and a relative position and an angle of the vehicle with respect to the traveling lane. The vehicle position recognition unit 41 may recognize the traveling lane according to the map information stored in the map storage unit 22 and the position of the vehicle acquired by the GNSS receiver 21. In addition, the lane markings drawn on the road surface around the vehicle may be extracted from the map information, and the relative position and angle of the vehicle with respect to the traveling lane may be recognized by comparing the extracted lane markings with the lane markings captured by the external camera 19.

The action plan unit 42 sequentially creates an action plan for driving the vehicle along the route. More specifically, the action plan unit 42 first determines a set of events for traveling on the target lane determined by the route determination unit 24 without the vehicle coming into contact with an obstacle. The events may include a constant speed traveling event in which the vehicle travels in the same lane at a constant speed, a preceding vehicle following event in which the vehicle follows a preceding vehicle at a certain speed which is equal to or lower than a speed selected by the driver or a speed which is determined by the prevailing environment, a lane changing event in which the vehicle change lanes, a passing event in which the vehicle passes a preceding vehicle, a merging event in which the vehicle merge into the traffic from another road at a junction of the road, a diverging event in which the vehicle travels into a selected road at a junction of the road, an autonomous driving end event in which autonomous driving is ended, and the driver takes over the driving operation, and a stop event in which the vehicle is brought to a stop when a certain condition is met, the condition including a case where the control unit 15 or the driver has become incapable of continuing the driving operation.

The conditions under which the action plan unit 42 invokes the stop event include the case where an input to the internal camera 26, the grip sensor 27, or the autonomous driving level switch 13 in response to an intervention request (a hand-over request) to the driver is not detected during autonomous driving. The intervention request is a warning to the driver to take over a part of the driving, and to perform at least one of the driving operation and the monitoring of the environment corresponding to the part of the driving that is to be handed over. The condition under which the action plan unit 42 invokes the stop even includes the case where the action plan unit 42 has detected that the driver has become incapable of performing the driving while the vehicle is traveling due to a physiological ailment according to the signal from a pulse sensor, the internal camera or the like.

During the execution of these events, the action plan unit 42 may invoke an avoidance event for avoiding an obstacle or the like according to the surrounding conditions of the vehicle (existence of nearby vehicles and pedestrians, lane narrowing due to road construction, etc.).

The action plan unit 42 generates a target trajectory for the vehicle to travel in the future corresponding to the selected event. The target trajectory is obtained by sequentially arranging trajectory points that the vehicle should trace at each time point. The action plan unit 42 may generate the target trajectory according to the target speed and the target acceleration set for each event. At this time, the information on the target speed and the target acceleration is determined for each interval between the trajectory points.

The travel control unit 38 controls the power unit 3, the brake device 4, and the steering device 5 so that the vehicle traces the target trajectory generated by the action plan unit 42 according to the schedule also generated by the action plan unit 42.

The storage unit 39 is formed by a ROM, a RAM, or the like, and stores information required for the processing by the autonomous driving control unit 35, the abnormal state determination unit 36, the state management unit 37, and the travel control unit 38.

The abnormal state determination unit 36 includes a vehicle state determination unit 51 and an occupant state determination unit 52. The vehicle state determination unit 51 analyzes signals from various devices (for example, the external environment recognition device 6 and the vehicle sensor 7) that affect the level of the autonomous driving that is being executed, and detects the occurrence of an abnormality in any of the devices and units that may prevent a proper execution of the autonomous driving of the level that is being executed.

The occupant state determination unit 52 determines if the driver is in an abnormal state or not according to a signal from the occupant monitoring device 11. The abnormal state includes the case where the driver is unable to properly steer the vehicle in autonomous driving of level 1 or lower that requires the driver to steer the vehicle. That the driver is unable to steer the vehicle in autonomous driving of level 1 or lower could mean that the driver is not holding the steering wheel, the driver is asleep, the driver is incapacitated or unconscious due to illness or injury, or the driver is under a cardiac arrest. The occupant state determination unit 52 determines that the driver is in an abnormal state when there is no input to the grip sensor 27 from the driver while in autonomous driving of level 1 or lower that requires the driver to steer the vehicle. Further, the occupant state determination unit 52 may determine the open/closed state of the driver's eyelids from the face image of the driver that is extracted from the output of the internal camera 26. The occupant state determination unit 52 may determine that the driver is asleep, under a strong drowsiness, unconscious or under a cardiac arrest so that the drive is unable to properly drive the vehicle, and the driver is in an abnormal condition when the driver's eyelids are closed for more than a predetermined time period, or when the number of times the eyelids are closed per unit time interval is equal to or greater than a predetermined threshold value. The occupant state determination unit 52 may further acquire the driver's posture from the captured image to determine that the driver's posture is not suitable for the driving operation or that the posture of the driver does not change for a predetermined time period. It may well mean that the driver is incapacitated due to illness or injury, and in an abnormal condition.

In the case of autonomous driving of level 2 or lower, the abnormal condition includes a situation where the driver is neglecting the duty to monitor the environment surrounding the vehicle. This situation may include either the case where the driver is not holding or gripping the steering wheel or the case where the driver's line of sight is not directed in the forward direction. The occupant state determination unit 52 may detect the abnormal condition where the driver is neglecting to monitor the environment surrounding the vehicle when the output signal of the grip sensor 27 indicates that the driver is not holding the steering wheel. The occupant state determination unit 52 may detect the abnormal condition according to the image captured by the internal camera 26. The occupant state determination unit 52 may use a per se known image analysis technique to extract the face region of the driver from the captured image, and then extracts the iris parts (hereinafter, iris) including the inner and outer corners of the eyes and pupils from the extracted face area. The occupant state determination unit 52 may detect the driver's line of sight according to the positions of the inner and outer corners of the eyes, the iris, the outline of the iris, and the like. It is determined that the driver is neglecting the duty to monitor the environment surrounding the vehicle when the driver's line of sight is not directed in the forward direction.

In addition, in the autonomous driving at a level where the drive is not required to monitor the surrounding environment or in the autonomous driving of level 3, an abnormal condition refers to a state in which the driver cannot promptly take over the driving when a driving takeover request is issued to the driver. The state where the driver cannot take over the driving includes the state where the system cannot be monitored, or, in other words, where the driver cannot monitor a screen display that may be showing an alarm display such as when the driver is asleep, and when the driver is not looking ahead. In the present embodiment, in the level 3 autonomous driving, the abnormal condition includes a case where the driver cannot perform the duty of monitoring the surrounding environment of the vehicle even though the driver is notified to monitor the surrounding environment of the vehicle. In the present embodiment, the occupant state determination unit 52 displays a predetermined screen on the display device 31 of the HMI 12, and instructs the driver to look at the display device 31. Thereafter, the occupant state determination unit 52 detects the driver's line of sight with the internal camera 26, and determines that the driver is unable to fulfill the duty of monitoring the surrounding environment of the vehicle if driver's line of sight is not facing the display device 31 of the HMI 12.

The occupant state determination unit 52 may detect if the driver is gripping the steering wheel according to the signal from the grip sensor 27, and if the driver is not gripping the steering wheel, it can be determined that the vehicle is in an abnormal state in which the duty of monitoring the surrounding environment the vehicle is being neglected. Further, the occupant state determination unit 52 determines if the driver is in an abnormal state according to the image captured by the internal camera 26. For example, the occupant state determination unit 52 extracts a driver's face region from the captured image by using a per se known image analysis means. The occupant state determination unit 52 may further extract iris parts (hereinafter, iris) of the driver including the inner and outer corners of the eyes and pupils from the extracted face area. The occupant state determination unit 52 obtains the driver's line of sight according to the extracted positions of the inner and outer corners of the eyes, the iris, the outline of the iris, and the like. It is determined that the driver is neglecting the duty to monitor the environment surrounding the vehicle when the driver's line of sight is not directed in the forward direction.

The state management unit 37 selects the level of the autonomous driving according to at least one of the own vehicle position, the operation of the autonomous driving level switch 13, and the determination result of the abnormal state determination unit 36. Further, the state management unit 37 controls the action plan unit 42 according to the selected autonomous driving level, thereby performing the autonomous driving according to the selected autonomous driving level. For example, when the state management unit 37 has selected the level 1 autonomous driving, and a constant speed traveling control is being executed, the event to be determined by the action plan unit 42 is limited only to the constant speed traveling event.

The state management unit 37 raises and lowers the autonomous driving level as required in addition to executing the autonomous driving according to the selected level.

More specifically, the state management unit 37 raises the level when the condition for executing the autonomous driving at the selected level is met, and an instruction to raise the level of the autonomous driving is input to the autonomous driving level switch 13.

When the condition for executing the autonomous driving of the current level ceases to be satisfied, or when an instruction to lower the level of the autonomous driving is input to the autonomous driving level switch 13, the state management unit 37 executes an intervention request process. In the intervention request process, the state management unit 37 first notifies the driver of a handover request. The notification to the driver may be made by displaying a message or image on the display device 31 or generating a speech or a warning sound from the sound generator 32. The notification to the driver may continue for a predetermined period of time after the intervention request process is started or may be continued until an input is detected by the occupant monitoring device 11.

The condition for executing the autonomous driving of the current level ceases to be satisfied when the vehicle has moved to an area where only the autonomous driving of a level lower than the current level is permitted, or when the abnormal state determination unit 36 has determined that an abnormal condition that prevents the continuation of the autonomous driving of the current level has occurred to the driver or the vehicle.

Following the notification to the driver, the state management unit 37 detects if the internal camera 26 or the grip sensor 27 has received an input from the driver indicating a takeover of the driving. The detection of the presence or absence of an input to take over the driving is determined in a way that depends on the level that is to be selected. When moving to level 2, the state management unit 37 extracts the driver's line of sight from the image acquired by the internal camera 26, and when the driver's line of sight is facing the front of the vehicle, it is determined that an input indicating the takeover of the driving by the driver is received. When moving to level 1 or level 0, the state management unit 37 determines that there is an input indicating an intent to take over the driving when the grip sensor 27 has detected the gripping of the steering wheel by the driver. Thus, the internal camera 26 and the grip sensor 27 function as an intervention detection device that detects an intervention of the driver to the driving. Further, the state management unit 37 may detect if there is an input indicating an intervention of the driver to the driving according to the input to the autonomous driving level switch 13.

The state management unit 37 lowers the autonomous driving level when an input indicating an intervention to the driving is detected within a predetermined period of time from the start of the intervention request process. At this time, the level of the autonomous driving after the lowering of the level may be level 0, or may be the highest level that can be executed.

The state management unit 37 causes the action plan unit 42 to generate a stop event when an input corresponding to the driver's intervention to the driving is not detected within a predetermined period of time after the execution of the intervention request process. The stop event is an event in which the vehicle is brought to a stop at a safe position (for example, an emergency parking zone, a roadside zone, a roadside shoulder, a parking area, etc.) while the vehicle control is degenerated. Here, a series of procedures executed in the stop event may be referred to as MRM (Minimum Risk Maneuver).

Figure 2:
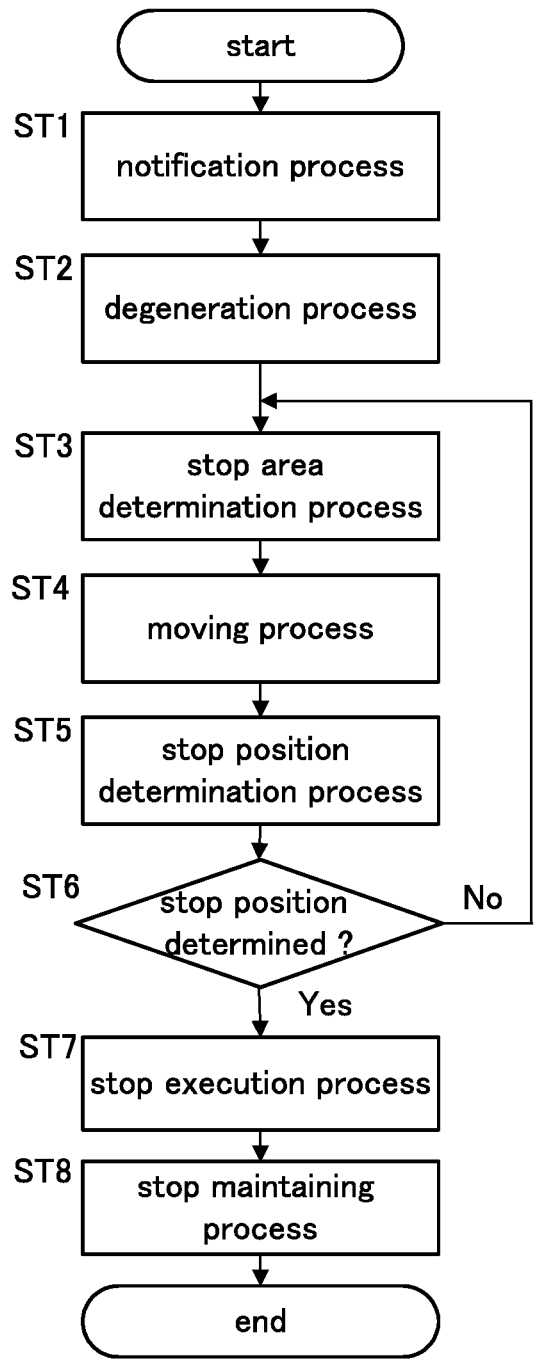
FIG. 2 is a flowchart of a stop process.

When the stop event is invoked, the control unit 15 shifts from the autonomous driving mode to the automatic stop mode, and the action plan unit 42 executes the stop process. Hereinafter, an outline of the stop process is described with reference to the flowchart of FIG. 2.

In the stop process, a notification process is first executed (ST1). In the notification process, the action plan unit 42 operates the external notification device 14 to notify the people outside of the vehicle. For example, the action plan unit 42 activates a horn included in the external notification device 14 to periodically generate a warning sound. The notification process continues until the stop process ends. After the notification process has ended, the action plan unit 42 may continue to activate the horn to generate a warning sound depending on the situation.

Then, a degeneration process is executed (ST2). The degeneration process is a process of restricting events that can be invoked by the action plan unit 42. The degeneration process may prohibit a lane change event to a passing lane, a passing event, a merging event, and the like. Further, in the degeneration process, the speed upper limit and the acceleration upper limit of the vehicle may be more limited in the respective events as compared with the case where the stop process is not performed.

Next, a stop area determination process is executed (ST3). The stop area determination process refers to the map information according to the current position of the own vehicle, and extracts a plurality of available stop areas (candidates for the stop area or potential stop areas) suitable for stopping, such as road shoulders and evacuation spaces in the traveling direction of the own vehicle. Then, one of the available stop areas is selected as the stop area by taking into account the size of the stop area, the distance to the stop area, and the like.

Next, a moving process is executed (ST4). In the moving process, a route for reaching the stop area is determined, various events along the route leading to the stop area are generated, and a target trajectory is determined. The travel control unit 38 controls the power unit 3, the brake device 4, and the steering device 5 according to the target trajectory determined by the action plan unit 42. The vehicle then travels along the route and reaches the stop area.

Next, a stop position determination process is executed (ST5). In the stop position determination process, the stop position is determined according to obstacles, road markings, and other objects located around the vehicle recognized by the external environment recognition unit 40. In the stop position determination process, it is possible that the stop position cannot be determined in the stop area due to the presence of surrounding vehicles and obstacles. When the stop position cannot be determined in the stop position determination process (No in ST6), the stop area determination process (ST3), the movement process (ST4), and the stop position determination process (ST5) are sequentially repeated.

If the stop position can be determined in the stop position determination process (Yes in ST6), a stop execution process is executed (ST7). In the stop execution process, the action plan unit 42 generates a target trajectory according to the current position of the vehicle and the targeted stop position. The travel control unit 38 controls the power unit 3, the brake device 4, and the steering device 5 according to the target trajectory determined by the action plan unit 42. The vehicle then moves toward the stop position and stops at the stop position.

After the stop execution process is executed, a stop maintaining process is executed (ST8). In the stop maintaining process, the travel control unit 38 drives the parking brake device according to a command from the action plan unit 42 to maintain the vehicle at the stop position. Thereafter, the action plan unit 42 may transmit an emergency call to the emergency call center by the communication device 8. When the stop maintaining process is completed, the stop process ends.

The vehicle control system 1 according to the present embodiment includes the external environment recognition device 6, the navigation device 9, the occupant monitoring device 11, and the control unit 15 as mentioned earlier. The vehicle position recognition unit 41 is configured to compute an agreement (degree of agreement) between an object on the road recognized by the external environment recognition device 6, in particular from the image captured by the external camera 19, and an object on the road contained in the map information. In the present embodiment, the object consists of a road marking on the road surface, in particular the lane marking lines (including lines between adjacent lanes, and lines indicating the boundary of the road such as a center line and a road shoulder line). The action plan unit 42 determines a stop area based on the agreement. The method for computing the agreement by the vehicle position recognition unit 41 is first discussed with reference to FIG. 3, and the method of determining the stop area by the action plan unit 42 is then discussed with reference to FIG. 4.

The vehicle position recognition unit 41 acquires the position of the vehicle S estimated by the navigation device 9, more specifically, the GNSS receiving unit 21 thereof at predetermined time intervals. The vehicle position recognition unit 41 then compares the estimated position of the vehicle S with the map information retained by the map storage unit 22, and determines the lane in which the vehicle S is traveling.

Figure 3A:
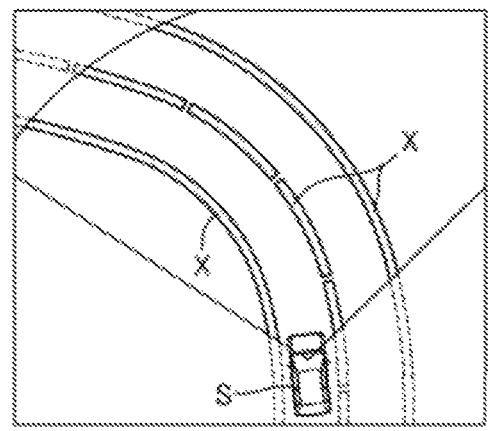
FIG. 3A is a diagram illustrating a matching of a road marking.

As shown in FIG. 3A, the vehicle position recognition unit 41 extracts a road marking drawn on a part of the road surrounding the vehicle from the map information retained by the map storage unit 22 according to the position of the vehicle S estimated by the navigation device 9, and the road marking drawn on a road surface located around the vehicle is extracted (the extracted road marking X). The range covered by this extraction process may be determined according to the range that can be covered by the external camera 19. In FIG. 4A, the road markings extracted by the vehicle position recognition unit 41 are indicated by solid lines, and those which are not extracted are indicated by broken lines.

Figure 3B:
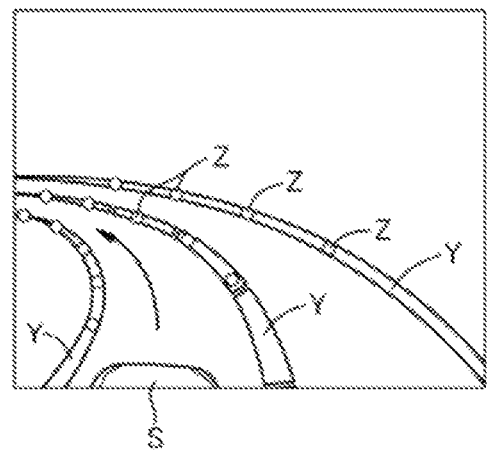
FIG. 3B is a diagram illustrating a matching of feature points of an image captured by a front camera.
Figure 3C:
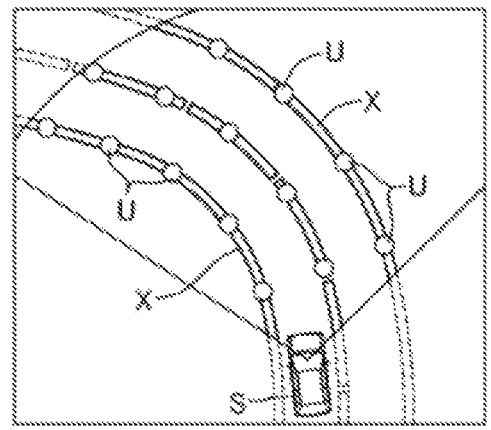
FIG. 3C is a diagram illustrating a matching of projected points and the road marking.

Thereafter, as shown in FIG. 3B, the vehicle position recognition unit 41 recognizes a road marking Y drawn on the road surface from the image acquired by the external environment recognition device 6, more specifically, the external camera 19, and a group of feature points Z indicating the position of the road marking is obtained. The vehicle position recognition unit 41 then performs coordinate conversion on the extracted feature points Z to compute the positions on the road surface (a projection points U) corresponding to the extracted feature points Z. The vehicle position recognition unit 41 then executes a process (matching process) of superimposing the projection points U on the extracted road marking X as shown in FIG. 3C to determine the position and the angle of the vehicle S relative to the traveling lane. Thereafter, the vehicle position recognition unit 41 identifies the position and the attitude (angle) of the vehicle S according to the computed relative position and angle of the vehicle S in the traveling lane.

Further, the vehicle position recognition unit 41 computes the degree of agreement indicating how closely the projection points U is superimposed on the extracted road marking X after the matching process. In the present embodiment, the vehicle position recognition unit 41 is configured to compute the degree of agreement as a ratio of the projection points U located on the extracted road marking X. The vehicle position recognition unit 41 sets the degree of agreement to 1 when all the projection points U are located on the extracted road marking X, and 0 when there is no projection point U located on the extracted road marking X.

The less accurate the position of the vehicle S estimated by the navigation device 9 is, the smaller the number of projection points U that are located on the extracted road marking X, and the lower the degree of agreement is. As described above, by evaluating the degree of agreement between the extracted road marking X and the projection points U, the reliability of the position of the vehicle S estimated by the navigation device 9 can be easily quantified as a degree of agreement.

When the position of the vehicle S cannot be estimated by the navigation device 9, the number of projection points U located on the extracted road marking X is substantially zero, and the degree of agreement is substantially zero.

The vehicle position recognition unit 41 computes the degree of agreement every time the vehicle S travels a predetermined distance (for example, 300 m), and outputs the degree of agreement to the storage unit 39. Further, the vehicle position recognition unit 41 outputs the computed degree of agreement to the action plan unit 42.

The storage unit 39 receives the degree of agreement from the vehicle position recognition unit 41 from the start of traveling, and stores it in a list as an agreement history (degree of agreement history).

When the degree of agreement received from the vehicle position recognition unit 41 during the course of traveling is equal to or above a predetermined threshold (determination threshold), a trajectory for the vehicle to follow or trace is created according to the position of the vehicle S estimated by the navigation device 9, the position and attitude of the vehicle S identified by the vehicle position recognition unit 41, and the detection result of the external environment recognition device 6, and forwards a corresponding command to the travel control unit 38 to control the vehicle S. On the other hand, when the degree of agreement is less than the determination threshold, the action plan unit 42 instructs the travel control unit 38 to control the vehicle S according to the detection result of the external environment recognition device 6. When an event other than the stop event is being executed, the determination threshold is set to a travel threshold which is set to 0.8 in the present embodiment.

In the present embodiment, the action plan unit 42 changes the determination threshold from the travel threshold to a stop threshold as a part of the degeneration processes. The stop threshold is greater than the travel threshold, and is set to 0.9 in the present embodiment. When the degeneration process is completed, the action plan unit 42 executes step ST3.

Details of the stop area determination process are discussed in the following with reference to the flowchart of FIG. 4.

In the first step ST11 of the stop area determination process, the action plan unit 42 acquires the degree of agreement from the vehicle position recognition unit 41, and determines if the degree of agreement is equal to or above a prescribed agreement threshold. If the agreement is equal to or above the agreement threshold, step ST12 is executed. If the agreement is less than the agreement threshold, step ST13 is executed. In the present embodiment, the agreement threshold is set to 0.95 as an example.

In step ST12, the action plan unit 42 determines if the agreement persisted to be equal to or above the agreement threshold from a point (a past point) which precedes the start point (start point or current point) of the stop process by a predetermined distance (a history check distance) to the start point where the stop process is started. More specifically, the action plan unit 42 extracts data on the agreement history from the start point to the past point stored in the storage unit 39, and determines if the data indicates that the agreement persisted or continued to be equal to or above the agreement threshold the whole time. In this embodiment, the history check distance is set to 1 km. The action plan unit 42 thus extracts agreements between the three pieces of data (the position of the vehicle S estimated by the navigation device 9, the position and attitude of the vehicle S identified by the vehicle position recognition unit 41, and the detection result of the external environment recognition device 6) over the traveling distance of 1 km preceding the start position from the agreement history stored in the storage unit 39, and determines if the three-way agreement is equal to or above the agreement threshold throughout the traveling distance of 1 km preceding the start position.

When all the extracted agreement is equal to or above the agreement threshold, the action plan unit 42 determines that the agreement persisted to be equal to or above the agreement threshold from the past point to the start point, and executes step ST14. When the extracted agreement falls below the agreement threshold at any time point, the action plan unit 42 determines that the agreement has failed to persist to be equal to or above the agreement threshold from the past point to the start point, and step ST15 is executed.

In step ST14, the action plan unit 42 sets a distance permitted to travel before coming to a stop, or in other words, a permitted distance as a first permitted distance. In the present embodiment, the first permitted distance is set to 3 km. When the setting is completed, the action plan unit 42 executes step ST16.

In step ST15, the action plan unit 42 sets the permitted distance to a second permitted distance shorter than the first permitted distance. In the present embodiment, the second permitted distance is set to 2 km. When the setting is completed, the action plan unit 42 executes step ST16.

In step ST13, the action plan unit 42 sets the permitted distance to a third permitted distance shorter than the first permitted distance and shorter than the second permitted distance. In the present embodiment, the third permitted distance is set to 1 km. When the setting is completed, the action plan unit 42 executes step ST16.

In step ST16, based on the position of the vehicle S estimated by the navigation device 9 and the map information, the action plan unit 42 searches for an area located within the permitted distance along the travel route from the point where the stop process is initiated. Then, an area in which the vehicle S can be brought to a stop is extracted, and the extracted area is determined as a stop area. When the determination is completed, the action plan unit 42 ends the stop area determination process.

Thereafter, the action plan unit 42 autonomously drive the vehicle to the determined stop area to be safely evacuated from the road, and then bring the vehicle to a stop at a stop position in the stop area.

The advantages of the vehicle control system 1 configured as described above are discussed in the following. For example, when the vehicle S travels between high-rise buildings in an urban area, a signal from a geodetic satellite may not reach the GNSS receiver 21 accurately. The error in the position of the vehicle S estimated by the navigation device 9 thus increases, and the agreement decreases as a result.

Figure 4:
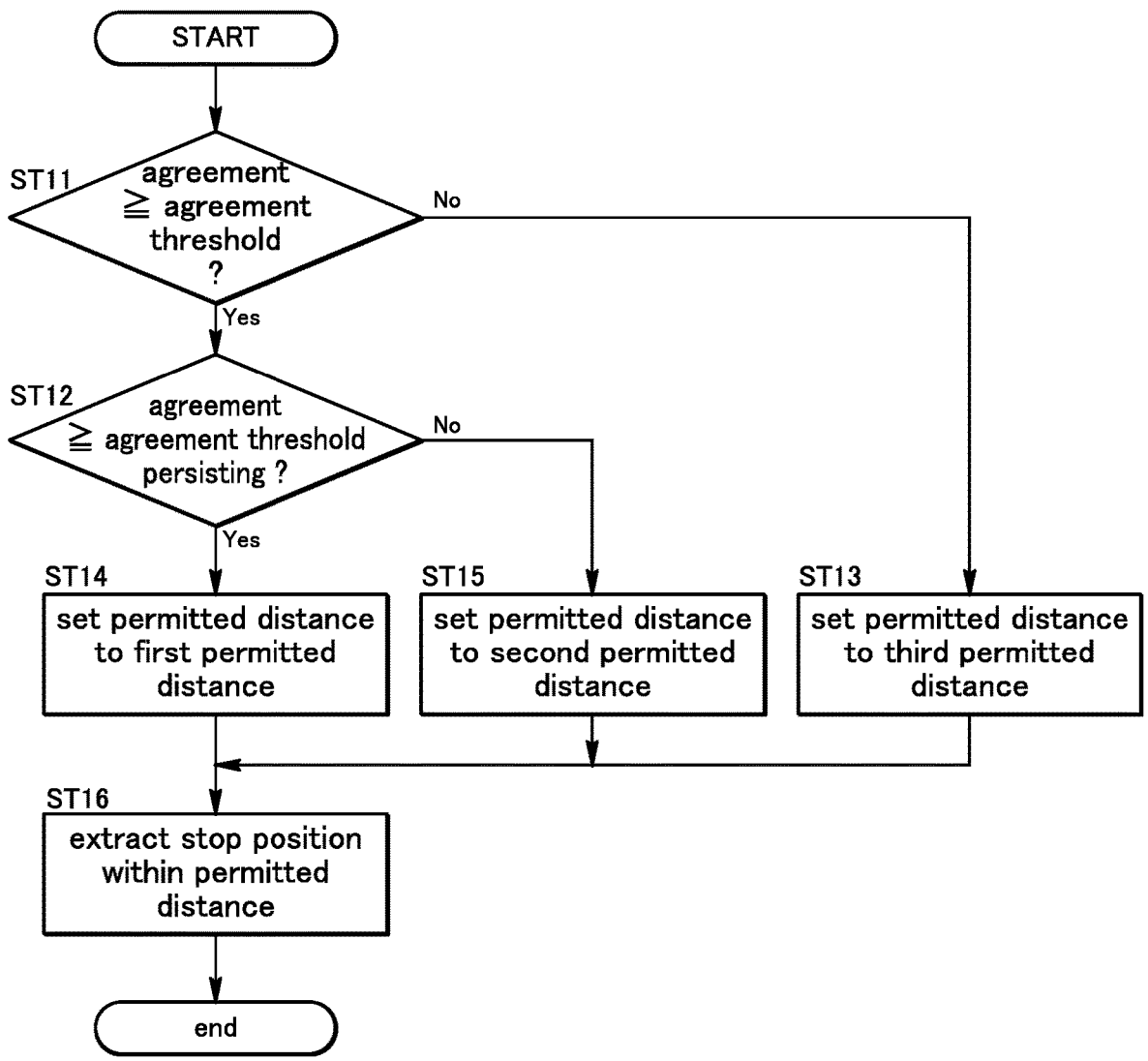
FIG. 4 is a flowchart of a stop area determination process.

As shown in FIG. 4, when the degree of agreement when the stop process is initiated is equal to or above the agreement threshold, the permitted distance is set to the first permitted distance or the second permitted distance. On the other hand, when the degree of agreement when the stop process is started is below the agreement threshold, the permitted distance is set to the third permitted distance shorter than both the first permitted distance and the second permitted distance.

Therefore, when the stop process is initiated, the accuracy of the position of the vehicle S estimated by the navigation device 9 is low, and the agreement is below the agreement threshold, the stop area is searched or extracted from a smaller area or within a closer range than when the agreement is equal to or above the agreement threshold. Thus, when the accuracy of the estimated position of the vehicle S is low, the travel distance until the vehicle comes to a stop can be shortened. Therefore, the distance traveled by the vehicle S in a state where the accuracy of the position of the vehicle S estimated by the navigation device 9 is low can be shortened. Thereby, the vehicle S can be evacuated more quickly and safely.

As shown in FIG. 4, when the degree of agreement at the start of the stop process is equal to or above the agreement threshold, and the state where the degree of agreement is equal to or above the agreement threshold persisted from the past point to the start point, the permitted distance for the vehicle to travel before coming to a stop is the first permitted distance. When the state in which the degree of agreement is equal to or above the agreement threshold has failed to persist, the permitted distance is set to the second permitted distance shorter than the first permitted distance.

If the degree of agreement has not persisted to be equal to or above the agreement threshold, it is assumed that the vehicle S is traveling in an environment where signals from geodetic satellites are at least partly obstructed, such as between high-rise buildings. Therefore, a signal from the geodetic satellites cannot be received so that the accuracy of the position of the vehicle S estimated by the navigation device 9 is likely to be low. In the present embodiment, when the action plan unit 42 determines that the agreement has not persisted to be equal to or above the agreement threshold according to the history of the agreement, the permitted distance is set shorter. Thereby, when the accuracy of the estimated position of the vehicle S is likely to be low, the traveling distance of the vehicle before coming to a stop is reduced. As a result, the risk of failing to identify the position of the vehicle S while driving to the stop position or the stop area can be reduced so that the vehicle S can be evacuated to the stop area more quickly and safely.

When the accuracy of the estimated position of the vehicle S is low, and the degree of agreement is equal to or below the determination threshold, the vehicle S is controlled based on the detection signal of the external camera 19. Thus, when the accuracy of the estimated position of the vehicle S is low and the agreement is equal to or below the determination threshold, the vehicle S can be controlled according to the external environment recognition device 6 without being based on the estimated position acquired by the navigation device 9.

For example, when the position of the vehicle S cannot be acquired by the navigation device 9, the degree of agreement is substantially zero, and is therefore far below the determination threshold. Therefore, the vehicle S is controlled according to the detection signal of the external camera 19. Therefore, the vehicle S can be controlled according to the external environment recognition device 6 without using the navigation device 9.

Furthermore, in the degeneration process, the determination threshold is set to the stop threshold. The stop threshold is greater than the determination threshold during processes other than the stop process such as the travel threshold while the position of the vehicle S is estimated by the navigation device 9 when the degree of agreement is higher. Thereby, in the stop process, the vehicle S can be more safely evacuated.

Second Embodiment

The vehicle control system 101 according to the second embodiment differs from the vehicle control system 1 of the first embodiment in that the action plan unit 42 executes step ST23 instead of step ST13, step ST24 instead of step ST14, step ST25 instead of ST15, and step ST26 instead of step ST16. The configuration of the vehicle control system 101 of the second embodiment is otherwise the same as that of the vehicle control system 1 of the first embodiment, and a description of such common part will not be repeated in the following description.

In the vehicle control system 101 according to the second embodiment, in step ST24, the action plan unit 42 sets a time (a permitted time) during which the vehicle is permitted to travel before coming to a stop. In step ST24, the action plan unit 42 sets the permitted time to a first permitted time. In the present embodiment, the first permitted time is set to 3 minutes. When the setting is completed, the action plan unit 42 executes step ST26.

In step ST25, the action plan unit 42 sets the permitted time to the second permitted time. The second permitted time is shorter than the first permitted time. In the present embodiment, the second permitted time is set to 2 minutes. When the setting is completed, the action plan unit 42 executes step ST26.

In step ST23, the action plan unit 42 sets the permitted time to a third permitted time. In the present embodiment, the third permitted time is set to one minute. When the setting is completed, the action plan unit 42 executes step ST26.

In step ST26, the action plan unit 42 acquires the current vehicle speed from the vehicle sensor 7, and computes an area that can be reached within the permitted time when the vehicle travels at the vehicle speed using the acquired vehicle speed. The action plan unit 42 may determine the reachable area based on the product of the vehicle speed and the permitted time. After that, the action plan unit 42 refers to the map information retained by the navigation device 9, extracts an area that is located within an area that can be reached from the current location within the permitted time and that is suitable for the vehicle to come to a stop, and determines the extracted area as the stop area. When the determination of the stop area is completed, the action plan unit 42 ends the stop area determination process.

Figure 5:
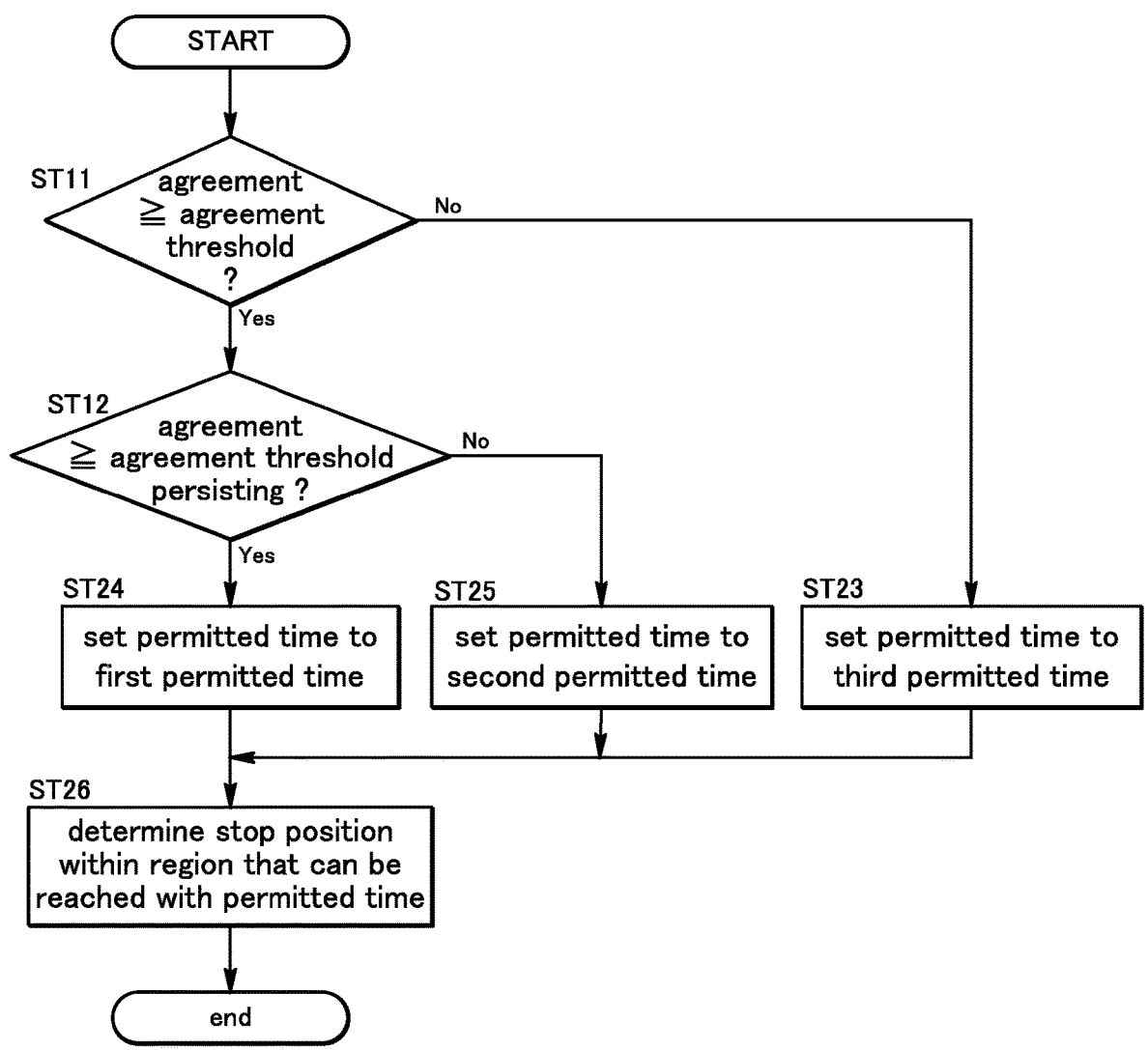
FIG. 5 is a flowchart of a stop area determination process according to a second embodiment of the present invention.

The mode operation and the advantages of the vehicle control system 101 configured as described above are discussed in the following. As shown in FIG. 5, when the degree of agreement when the stop process is initiated is equal to or above the agreement threshold, the permitted time is set to the first permitted time or the second permitted time. On the other hand, when the degree of agreement when the stop process is initiated is below the agreement threshold, the permitted time is set to the third permitted time shorter than the first permitted time and the second permitted time.

Thus, when the stop process is initiated, if the accuracy of the position of the vehicle S estimated by the navigation device 9 is low, the stop area is likely to be extracted from a range closer to the vehicle S than when the agreement is equal to or above the agreement threshold so that the distance which the vehicle S is required to travel before reaching the stop area can be reduced. Thus, when the position of the vehicle acquired by the navigation device 9 is determined to be inaccurate, the vehicle is required to travel a shorter distance before reaching the stop area so that the vehicle can be evacuated to the stop area with a minimum time delay.

When the degree of agreement when the stop process is initiated is equal to or above the agreement threshold, the permitted time is set to the first permitted time if the degree of agreement persists to be equal to or above the agreement threshold, and to the second permitted time shorter than the first permitted time if the degree of agreement does not persist to be equal to or above the agreement threshold.

In the present embodiment, when the action plan unit 42 determines that the agreement has not persisted to be equal to or above the agreement threshold according to the history of the agreement, the permitted time is set shorter. As a result, the travel time required for the vehicle S to travel from the start position to the stop position can be minimized. This reduces the risk of the vehicle S becoming unable to identify the own position during the time in which the vehicle travels from the start position to the stop position so that the vehicle can be evacuated to the stop area with a minimum risk.

The present invention has been described in terms of specific embodiments, but is not limited by such embodiments, but can be modified in various ways without departing from the scope of the present invention. In the above embodiment, the map storage unit 22 may store the map information in two levels, outline map information and detailed map information. The outline map information may include building information, outlines of road directions and types, traffic control information, address information (address/postal code), facility information, telephone number information, and the like. The detailed map information may include map details primarily consist of road information. The map storage unit 22 may store the detailed map information in the storage unit 39 of the control unit 15.

In the above embodiments, the degree of agreement is computed based on the image captured by the external camera 19, but the present invention is not limited to this mode. The degree of agreement may be any value as long as it represents the accuracy of recognizing the position of the vehicle S based on the signal of the geodetic satellite, and may be computed based on the detection result by another external environment recognition device 6. For example, the agreement may be computed based on detection results of the radar 17 and the lidar 18.

In the above embodiment, the road marking was used as the object, but the present invention is not limited to this mode. For example, a road sign, a traffic signal, a building, or the like may be used as an object.

The invention claimed is:

1. A vehicle control system, comprising:
a control unit for steering, accelerating, and decelerating a vehicle;
an occupant monitoring device configured to monitor a driver of the vehicle;
a map device storing map information, and configured to estimate a position of the vehicle; and
an external environment recognition device for recognizing a surrounding environment of the vehicle,
wherein the control unit is configured to execute a parking process by which the control unit searches for and locates a prescribed parking position in a parking area located within a permitted distance along a travel route from a start point where the parking process is initiated,
wherein the control unit is further configured to drive the vehicle to the parking position and to park the vehicle in the parking position when it is detected that the driver has become incapable of properly maintaining a traveling state of the vehicle, and
wherein, in executing the parking process, the control unit:
computes an agreement between an object contained in the map information based on an estimated position of the vehicle and an object on a road detected by the external environment recognition device,
determines if the agreement has persisted to be equal to or above an agreement threshold from a past point to the start point, the past point preceding the start point by a predetermined distance,
sets the permitted distance as a first permitted distance upon determining that the agreement has persisted to be equal to or above the agreement threshold from the past point to the start point,
sets the permitted distance as a second permitted distance shorter than the first permitted distance upon determining that the agreement has failed to persist to be equal to or above the agreement threshold from the past point to the start point,
determines, as the parking area, an area located within the set permitted distance from the start point, and
drives the vehicle to the determined parking area and parks the vehicle in the parking position located in the determined parking area.

2. The vehicle control system according to claim 1, wherein, in executing the parking process, the control unit controls the vehicle according to the position of the vehicle estimated by the map device and a detection result of the external environment recognition device when the agreement is equal to or above a prescribed parking threshold, and according to the detection result of the external environment recognition device and not according to the position of the vehicle estimated by the map device when the agreement is below the prescribed parking threshold.

3. The vehicle control system according to claim 2, wherein, in executing the parking process, the control unit determines the agreement to be below the parking threshold when the position of the vehicle cannot be estimated by the map device, and controls the vehicle according to the detection result of the external environment recognition device.

4. The vehicle control system according to claim 2, wherein, in executing a process other than the parking process, the control unit controls the vehicle according to the position of the vehicle estimated by the map device and the detection result of the external environment recognition device when the agreement is equal to or above a prescribed travel threshold, and according to the detection result of the external environment recognition device and not according to the position of the vehicle estimated by the map device when the agreement is below the travel threshold.

5. The vehicle control system according to claim 1, wherein the map information includes road marking information, and in executing the parking process, the control unit compares an image of a road marking acquired by the external environment recognition device with information of the road marking extracted from the map information according to the estimated position of the vehicle to determine the agreement.

6. A vehicle control system, comprising:
a control unit for steering, accelerating, and decelerating a vehicle;
an occupant monitoring device configured to monitor a driver of the vehicle;
a map device storing map information, and configured to estimate a position of the vehicle; and
an external environment recognition device for recognizing a surrounding environment of the vehicle,
wherein the control unit is configured to execute a parking process by which the control unit searches for and locates a prescribed parking position, in a parking area located along a travel route, in which the vehicle may be parked within a permitted time, the permitted time beginning at a point when the parking process is initiated,
wherein the control unit is further configured to drive the vehicle to the parking position and to park the vehicle when it is detected that the driver has become incapable of properly maintaining a traveling state of the vehicle, and
wherein, in executing the parking process, the control unit:
  computes an agreement between an object contained in the map information based on an estimated position of the vehicle and an object on a road detected by the external environment recognition device,
  determines if the agreement has persisted to be equal to or above an agreement threshold between a start time point and a past time point, the start time point being a time point when the parking process is initiated, the past time point being a time point preceding the start time point by a prescribed time,
  sets the permitted time as a first permitted time upon determining that the agreement has persisted to be equal to or above the agreement threshold between the start time point and the past time point,
  sets the permitted time as a second permitted time shorter than the first permitted time upon determining that the agreement has failed to persist to be equal to or above the agreement threshold between the start time point and the past time point,
  determines, as the parking area, an area that can be reached within the set permitted time, and
  drives the vehicle to the determined parking area and parks the vehicle in the parking position located in the determined parking area.

7. A vehicle control system, comprising:
a control unit for steering, accelerating, and decelerating a vehicle;
an occupant monitoring device configured to monitor a driver of the vehicle;
a map device storing map information, and configured to estimate a position of the vehicle; and
an external environment recognition device for recognizing a surrounding environment of the vehicle,
wherein the control unit is configured to execute a parking process by which the control unit searches for and locates a prescribed parking position in a parking area located within a permitted distance along a travel route from a start point where the parking process is initiated,
wherein the control unit is further configured to drive the vehicle to the parking position and to park the vehicle in the parking position when it is detected that the driver has become incapable of properly maintaining a traveling state of the vehicle, and
wherein, in executing the parking process, the control unit:
  computes an agreement between an object contained in the map information based on an estimated position of the vehicle and an object on a road detected by the external environment recognition device,
  determines if the agreement is below an agreement threshold at initiation of the parking process and if the agreement has persisted to be equal to or above the agreement threshold from a past point to the start point, the past point preceding the start point by a predetermined distance,
  sets the permitted distance as a first permitted distance upon determining that the agreement is equal to or above the agreement threshold at the initiation of the parking process and that the agreement has persisted to be equal to or above the agreement threshold from the past point to the start point,
  sets the permitted distance as a second permitted distance shorter than the first permitted distance upon determining that the agreement is equal to or above the agreement threshold at the initiation of the parking process and that the agreement has failed to persist to be equal to or above the agreement threshold from the past point to the start point,
  sets the permitted distance as a third permitted distance shorter than the second permitted distance upon determining that the agreement is below the agreement threshold at the initiation of the parking process,
  determines, as the parking area, an area located within the set permitted distance from the start point, and
  drives the vehicle to the determined parking area and parks the vehicle in the parking position located in the determined parking area.

* * * * *